(12) United States Patent
Gozdz et al.

(10) Patent No.: US 6,482,540 B1
(45) Date of Patent: Nov. 19, 2002

(54) MULTI-FOLD RECHARGEABLE BATTERY CELL STRUCTURE

(75) Inventors: Antoni S. Gozdz, Ocean, NJ (US); Tao Zheng, Eatontown, NJ (US)

(73) Assignee: Valence Technology (Nevada), Inc., Henderson, NV (US)

( * ) Notice: Subject to any disclaimer, the term of this patent is extended or adjusted under 35 U.S.C. 154(b) by 92 days.

(21) Appl. No.: 09/616,700

(22) Filed: Jul. 14, 2000

(51) Int. Cl.⁷ .................................................. H01M 6/10
(52) U.S. Cl. ........................................ 429/94; 429/127
(58) Field of Search .......................... 429/122, 127, 429/162, 94; 29/623.1; H01M 6/10

(56) References Cited

U.S. PATENT DOCUMENTS

| | | |
|---|---|---|
| 5,154,989 A | 10/1992 | Howard et al. |
| 5,582,931 A | 12/1996 | Kawakami |
| 5,618,318 A | 4/1997 | Reddy et al. |
| 5,635,312 A * | 6/1997 | Yanagisawa et al. .......... 429/94 |
| 5,667,909 A * | 9/1997 | Rodriguez et al. ........... 429/127 |
| 5,776,628 A * | 7/1998 | Kraft et al. .................... 429/94 |
| 6,037,077 A | 3/2000 | Nowaczyk |

* cited by examiner

Primary Examiner—Gabrielle Brouillette
Assistant Examiner—M. Wills
(74) Attorney, Agent, or Firm—Harness, Dickey & Pierce, PLC

(57) ABSTRACT

A multi-fold rechargeable battery cell structure comprising electrode elements and separator elements, wherein relief slots are formed along the fold axes of the outermost electrode elements in order to relieve folding stresses which could result in damage and impairment of the operation of the cell. The slots are formed adjacent to regions of intact electrode material in each outermost electrode element and are arranged such that the slots of one electrode element are aligned with the regions of intact electrode material of the other electrode element. In this manner, electrode element planar integrity is maintained while the effective laminate fold region thickness is reduced.

22 Claims, 3 Drawing Sheets

MULTI-FOLD RECHARGEABLE BATTERY CELL STRUCTURE

BACKGROUND OF THE INVENTION

The present invention relates to rechargeable battery cells, typically of a flat, multi-layer, laminate form, which are folded, accordion style, to achieve a physically compact, yet high electrode area, battery structure having a resultant high electrical energy storage and power capacity. In particular, the invention provides such a folded battery cell structure which is less susceptible to laminate element damage, especially in the stressed outer fold regions, and also describes a method of fabricating such a cell structure which is capable of being readily, economically, and precisely practiced in commercial application.

Battery cell structures of general concern comprise an assembly of flat, planar, sheet-like elements which include positive and negative electrodes and an interposed separator, along with electrically conductive current collector elements associated with the respective electrodes. In a widely utilized structure of this type, such as described, for example, in U.S. Pat. Nos. 5,460,904 and 5,554,459, the disclosures of which are incorporated herein by reference, the compositions of the electrode and separator elements comprise polymeric matrix components which enable the fabrication of a thin, flat unified cell structure by means of simple heat and pressure lamination. The multi-fold cell structure is usually effected by repeated reverse, or zigzag, folding of an elongate cell of selected lateral dimension at spaced parallel axes to achieve the desired longitudinal dimension of the cell.

While the basic laminated structure of a cell of this type is highly advantageous in its maintaining the essential close physical contact between the laminar elements, the accompanying restriction of relative lateral movement between such elements during a folding operation tends to result in stresses within the elements, particularly in the region of the extended outer circumferences of the folds. Such stresses can lead to breaks and compression creases in the electrodes and the incorporated current collector elements, either of which may result in disruption of cell operation. The normally thin profile of a single cell structure, i.e., a cell comprising a positive electrode, a negative electrode and one intervening separator, and the flexibility of the polymeric component generally keep these stresses to an acceptable level. However, the use of increasing ratios of solid active electrode materials reduces the overall flexibility of the laminate cell sheets and results in an increase of folding stress.

This deleterious effect is greatly aggravated in bicell structures which are designed to increase energy storage capacity by including an additional electrode, current collector and separator element in the laminate assembly and often results in cell component damage and interrupted operation. With a pair of like polarity electrodes and associated separator and current collector elements laminated to the opposite surfaces of a common intermediate opposite polarity electrode element, the complete bicell has an increased composite thickness which increases the likelihood of damaging stress in the now vastly extended outer circumference region of a cell structure fold.

Various attempts have been made to alleviate this problem of excessive stress on cell structure components arising from the inordinate degree of outer laminate cell element extension in the regions of transverse folding. The geometry of the folded cell structure, however, severely limits the available solutions to those which in effect eliminate structural material from cell fold regions. However, this solution results in a cell structure in which exterior laminate elements, namely, the electrodes and associated current collectors, are reduced from continuous sheets to a series of separate elements, thus leading to a mere stack of electrodes superficially associated through an intermediate separator medium. Such a single cell structure is described in U.S. Pat. No. 5,498,489. This structure suffers from the major disadvantage of a lack of means to ensure the alignment of the overlying opposed electrodes in precise register in order to achieve optimum cell capacity, such capacity being a function of the area encompassed by the overlap of opposing electrode surfaces.

Other stacked electrode cell structures of single cell type are shown in U.S. Pat. Nos. 5,525,441, and 5,667,909, which structures similarly lack means for ensuring efficient electrode alignment and further suffer from the need for a multiplicity of conductor members to connect each of the multiple electrodes in order to utilize the stored energy. This adds to the intricacies of cell fabrication, and also results in accumulated electrical resistance which seriously detracts from the desired increase in cell energy.

SUMMARY OF THE INVENTION

The present invention provides a multi-fold laminated cell rechargeable battery structure which relieves to a remarkable extent the stresses normally developed in the region of cell element folds and thereby prevents cell element damage even in preferred, higher capacity bicell structures. In particular, in accordance with the present invention, prior to the final cell lamination, portions of each of the outer electrode members are removed from the immediate lateral regions of the intended cell folds. The portions removed result in the formation of slots adjacent to regions of intact electrode material in the electrode members. The battery cell is then assembled in such a manner that the slots in the first electrode member are aligned with the regions of intact electrode material in the second electrode member and the slots in the second electrode member are aligned with the regions of intact electrode material in the first electrode member. In the case of a bicell structure the present invention ensures that the maximum thickness in the fold regions will not be significantly greater than the thickness of a single cell type structure. This limited structure thickness can tolerate the subsequent folding operation without significant laminate element damage.

The slots formed in the outer electrode elements effectively prevent fold stresses, while the adjacent regions of intact electrode material are sufficient to maintain prelamination longitudinal integrity and resistance to shifting displacement or distortion. This helps in the ready, precise alignment of cell elements without resort to extraordinary assembly means. In particular, simple alignment of the peripheries of the individual sheet elements of a cell according to the present method will ensure proper registry of the slotted regions and of the overlapping electrode segments. This is unlike prior art practices in which separate registry of individual electrode elements was required and often hindered by intervening opaque cell elements. Lamination of the aligned elements fixes the cell elements in proper position for subsequent folding of the assembly to achieve the desired multi-fold cell. In addition, the continuity of the associated current collector elements is maintained along the entire extended cell structure which allows the use of a minimum of conductor to provide connection terminals.

The present invention may be employed with any combination of the electrode, separator, collector, and electrolyte elements and compositions in current use in the industry, particularly those of the type described in the aforementioned incorporated patents. In addition to the cast polymeric composition separator elements, pre-formed sheets of microporous polymer, such as commercially available fabrications of polyolefins, may be used.

DESCRIPTION OF THE INVENTION

Figure 1:
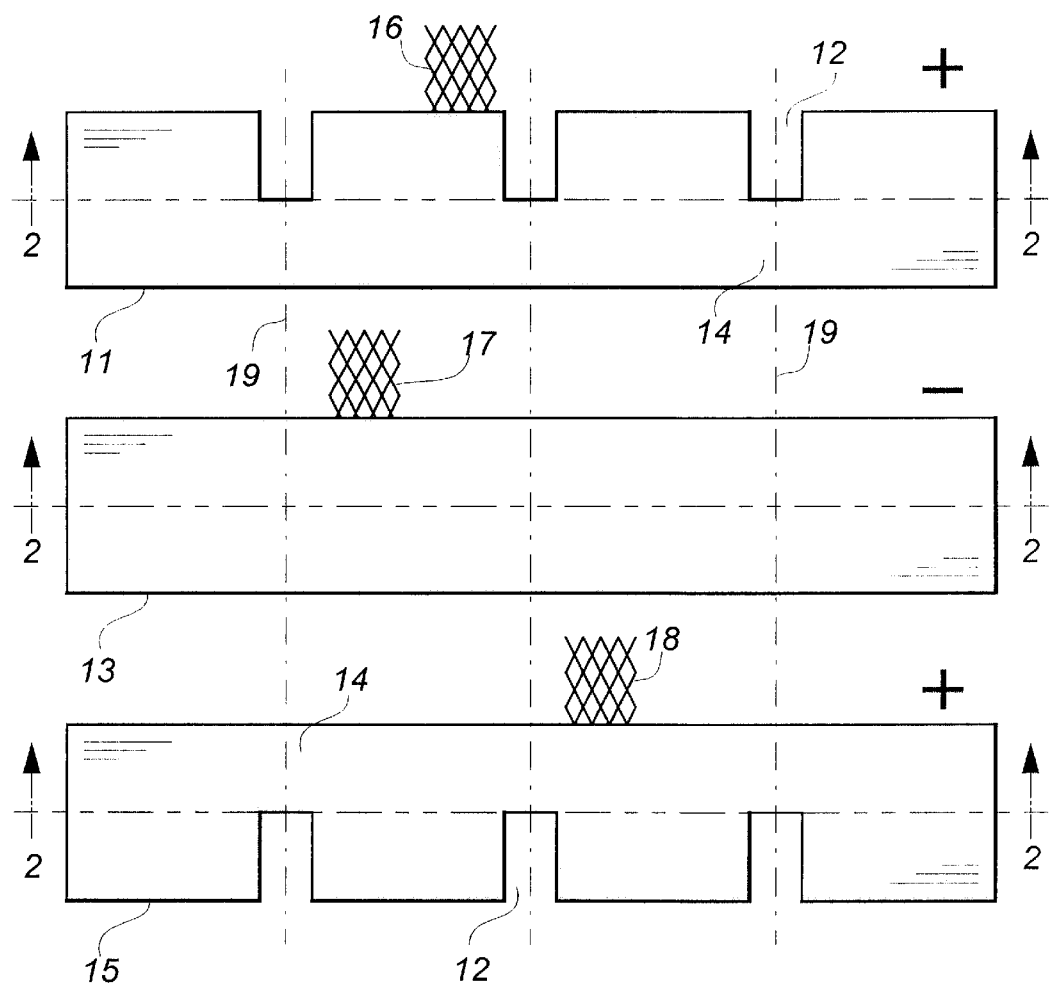
FIG. 1 is an exploded plan view of the component electrode elements of a bicell battery structure according to a first embodiment of the present invention.

FIG. 1 is an exploded plan view showing electrode members 11, 13, 15, intended for assembly into a bicell battery structure. Relief slots 12, are formed adjacent to regions of intact electrode material 14, and along fold axes 19, of the outermost electrode members 11, 15, having a first polarity, in this instance positive polarity. The slots 12, are formed in the electrode members 11, 15, such that when the electrode members 11, 15, are assembled in the bicell structure the slots 12, of the electrode member 11, align with the regions of intact electrode material 14, of the electrode member 15, and the slots 12, of the electrode member 15, align with the regions of intact electrode material 14, of the electrode member 11. In accordance with the present invention, the thickness of the bicell battery structure is reduced in the fold areas by the thickness of one electrode member, yet because of the regions of intact electrode material 14, each electrode member 11, 15, retains resistance to shifting displacement within its plane.

Further as shown in FIG. 1, the common electrode member 13, of opposite polarity, in this case negative polarity, need not have relief slots formed therein. Rather, the relief is required only in the outermost electrode members 11, 15, where the greater and damaging stresses develop during folding. Further, removal of portions of the common electrode 13, would result in less overlap in the bicell structure with the active intact areas of the electrode elements 11, 15, and would decrease the useable intercalating material.

Also shown in FIG. 1 are extending strips 16, 17, 18, of electrically conductive current collector material, such as foil mesh, which serve as connection terminals for the bicell battery cell. These strips 16, 17, 18, which may be extensions of collector elements incorporated within the electrode elements 11, 13, 15, or may be separately embedded in or affixed to the respective electrode elements 11, 13, 15. The strips 16, 17, 18, are positioned to provide a current take-off connection near the center of or at regularly distributed locations along an electrode collector span. In addition, the strips 16, 18, of like polarity overlap in the completed bicell structure to yield a provide a closely associated pair of terminals, as may be seen in FIG. 5.

Figure 2:
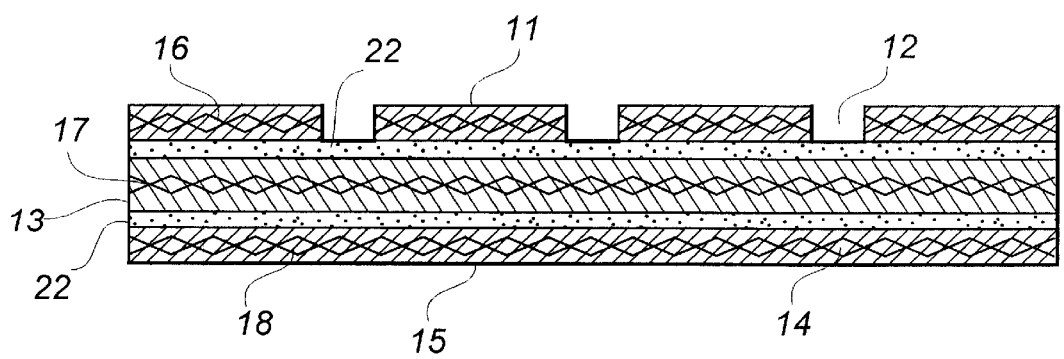
FIG. 2 is an elevation view taken at lines 2—2 of FIG. 1, showing the bicell battery structure including the electrode elements of FIG. 1.

An elevation view of the bicell structure of FIG. 1 is shown in FIG. 2. The electrode elements 11, 13, 15 each have a co-extensive conductive current collector element 16, 17, 18, respectively, which may be embedded at any level within the electrode elements 11, 13, 15, as described in U.S. Pat. No. 5,587,253. The current collector elements 16, 17, 18, should allow for ready diffusion of plasticizer vapors or penetration of subsequently applied processing fluids, such as extraction solvents and electrolyte solutions, throughout the cell. For example, the current collector elements 16, 17, 18, may be formed of expanded metal mesh. Prior to bicell lamination, the electrode members 11, 13, 15, are assembled in the relative sequence and orientation shown in FIG. 1 with intervening separator elements 22. The separator elements 22, are at least coextensive membranes of conventional electrically insulating and ionically conductive polymeric material, such as the cast films of the aforementioned patents or any of the commercially available virgin or polymer-coated microporous polyolefin electrochemical cell separator membranes. Preferably, the separator elements 22, have dimensions slightly larger than the dimensions of the electrode members 11, 13, 15, so that the separator elements 22, extend beyond the edges of the electrode members 11, 13, 15. With the lateral edges of electrode members 11, 15, in alignment and the relief slots 12, centered on the prospective fold axes 19, the slots 12, are automatically precisely aligned with the regions of intact electrode material 14, of the other electrode member. As previously noted, in this manner, the thickness of the bicell in the area of the folds is not substantially greater than that of a single cell comprising, for example, only two electrode members and one intervening separator element. The second separator element contributes only a negligible thickness to the bicell assembly.

Figure 5:
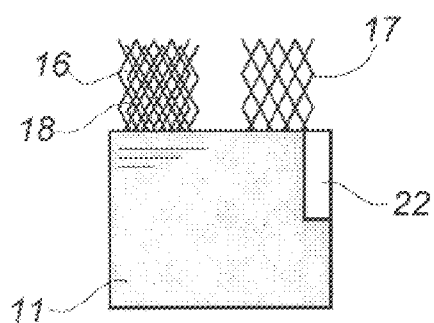
FIG. 5 is a plan view of a multi-fold bicell battery formed by folding of the battery structure of FIG. 2.

In FIG. 5 shows the bicell structure which results from the zigzag folding of the bicell of FIG. 2. As previously noted, such zigzag folding brings first polarity current collector tabs 16, 18, into conjunction to form a first cell terminal while the remaining tab 17, of the common electrode member 13, is disposed at a safe distance from the tabs 16, 18, and forms the second cell terminal.

Figure 3:
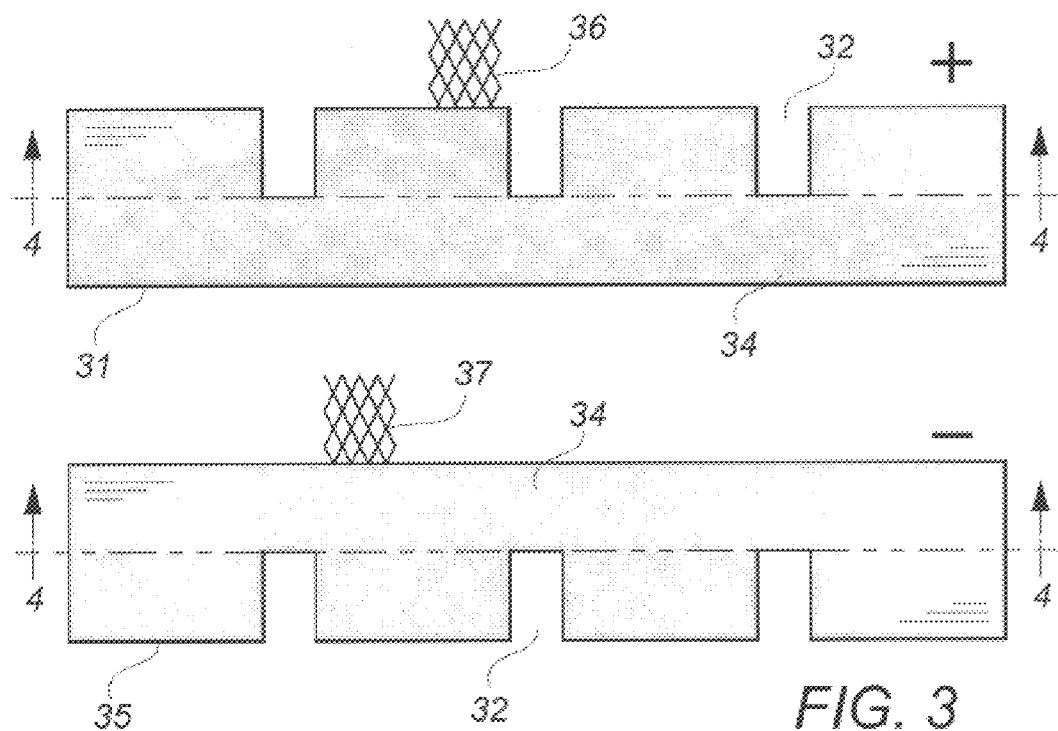
FIG. 3 is an exploded plan view of the component electrode elements of a single cell battery structure according to a further embodiment of the present invention.
Figure 4:
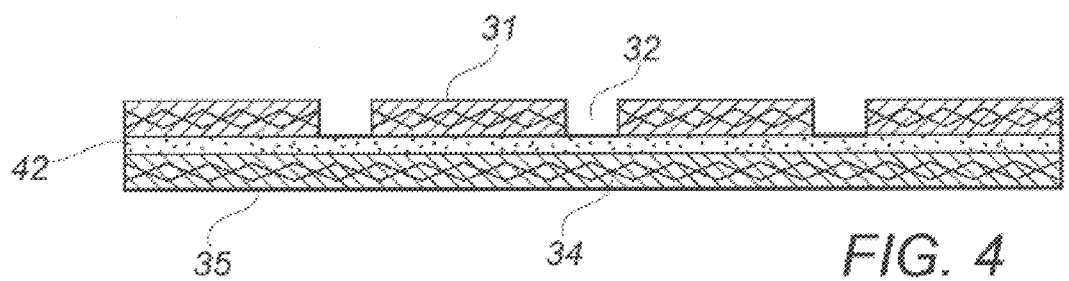
FIG. 4 is an elevation view taken at lines 4—4 of FIG. 3, showing the single cell battery structure including the electrode elements of FIG. 3.
Figure 6:
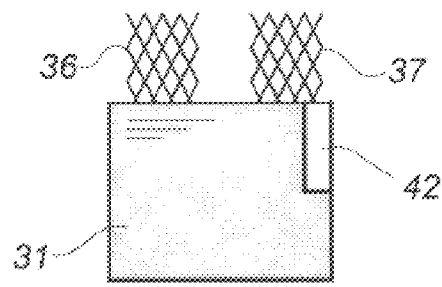
FIG. 6 is a plan view of a multi-fold single cell battery formed by folding of the battery structure of FIG. 4.

The present invention which utilizes the relief slots in electrode members as described above finds its greatest advantage with respect to bicell structures. However, benefit may also be accomplished in multi-folded single cell structures having only two electrodes. As shown in FIG. 3, a single cell structure includes a first electrode element 31, of first polarity, in this case positive polarity, and a second electrode element 35, of opposite polarity to the first polarity, in this case negative polarity. Both the first electrode element 31, and the second electrode element 35, have slots 32, formed adjacent regions of intact electrode material 34. Upon assembly of the single cell battery structure, the slots 32, of first electrode element 31, align with regions of intact electrode material 34, of second electrode element 35, and the slots, 32 of second electrode element 35, align with regions of intact electrode material 34, of first electrode element 31. As shown in FIG.4, the single cell assembly includes the first electrode element 31, and the second electrode element 35, with an interposed separator element 42. In this single cell configuration, it is preferable that regions of the negative electrode element, (in this case second electrode element 35) at the periphery of the relief slots 12, provide a sufficient amount of active electrode material to account stoichiometrically for potential migration of the store of intercalated Li ions in the opposing intact positive electrode element, (in this case first electrode element 31). In this way the possibility of lithium metal plating during cell charging is minimized. This may be accomplished in a number of ways, such as by increasing the material thickness of the negative electrode element, but is preferably effected by narrowing the relief slots 12, in order to provide a more direct transverse path for migrating Li ions. The location of collector tabs 36, 37 in the electrode element 31, 35, provides safely separated terminal tabs in the final single cell structure as shown in FIG. 6.

It is noted that the element dimensions in the drawing figures are grossly exaggerated for the purpose of presentation clarity. In practice, the actual cell component thickness will be approximately 0.08 to 0.16 mm for the positive electrode element with embedded collector element, 0.1 to 0.3 mm for the negative electrode element, and 0.02 to 0.03 mm for the microporous separator membrane element. Such dimensions would yield, after normal element calendering and laminate compression operations, a bicell structure of FIG. 2 of about 0.5 mm, and a single cell structure of FIG. 4 of about 0.3 mm. In such cell structures, effective relief slots would preferably have a width of up to about 2.5 mm. The overall surface dimensions of electrode elements, as seen in FIG. 1 or 3, may, of course, be set as necessary to yield a final battery cell of any desired size and resulting capacity.

Figure 7:
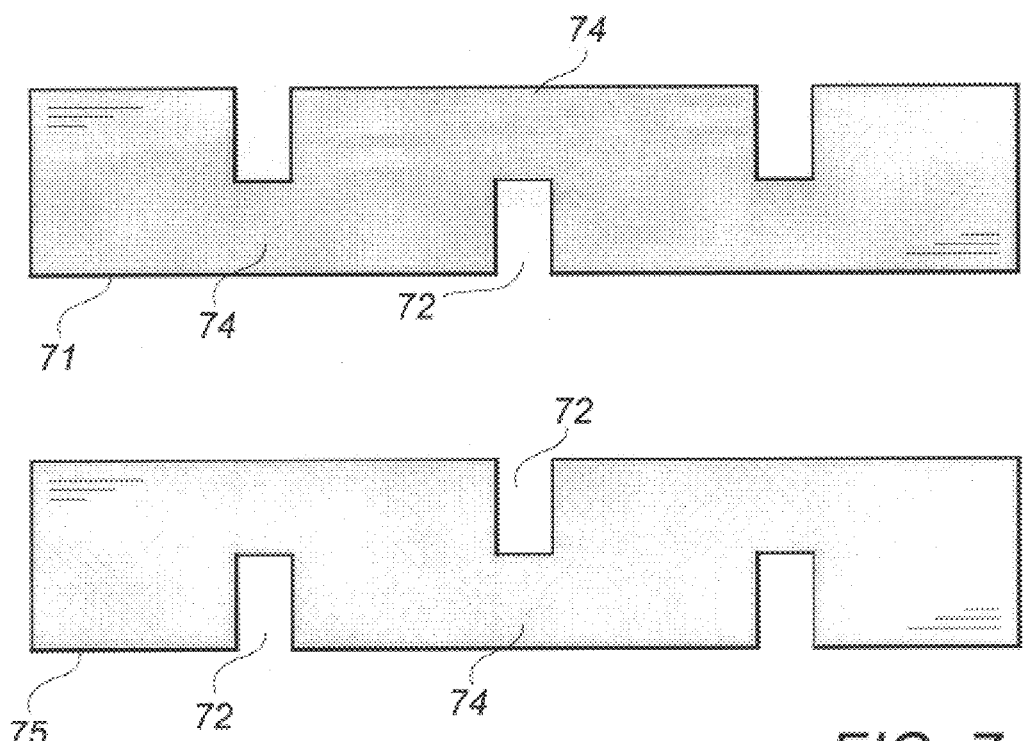
FIG. 7 is an exploded plan view of complementary electrode elements of a battery cell according to another embodiment of the present invention.
Figure 8:
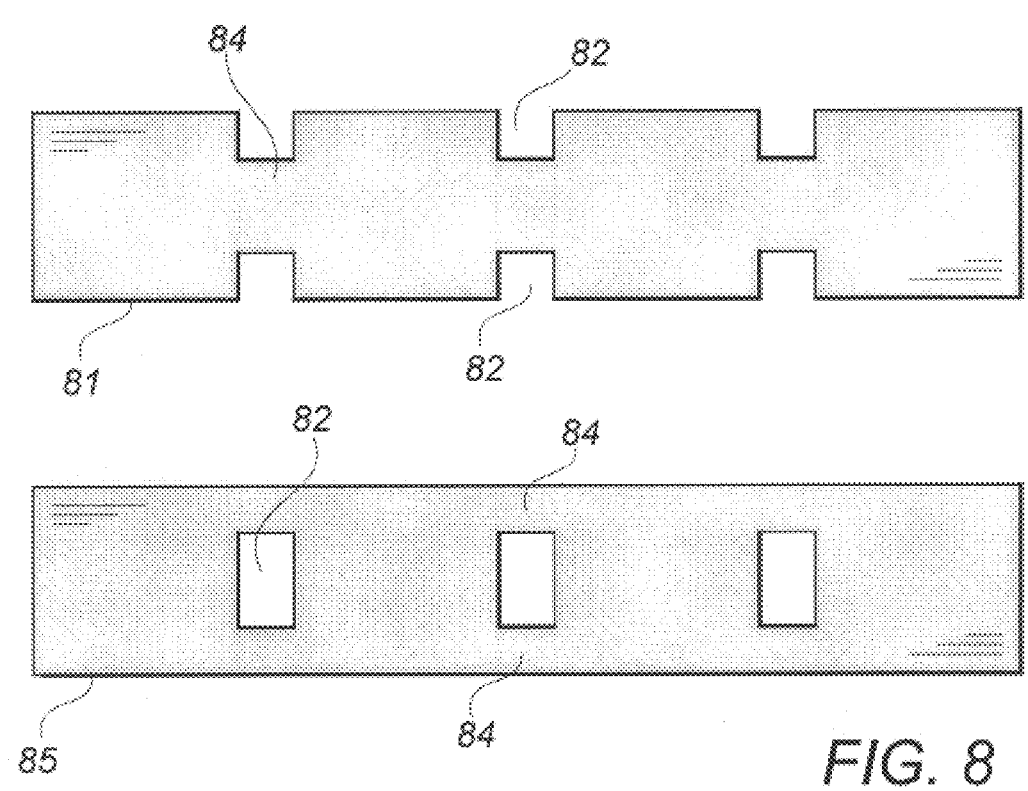
FIG. 8 is an exploded plan view of complementary electrode elements of a battery cell according to yet another embodiment of the present invention.

An important feature of the present invention is that the slots are formed in the electrode elements in a manner which maintains a balance in the cell capacity over the repeated folded segments. Therefore, it is preferred that the slotted electrode elements be complementary to one another, e.g. the slots of one electrode element align with the regions of intact electrode material of the other electrode element. FIGS. 1 and 3 each show a similar pattern of complementary electrode element slots, wherein the slots extend from one edge of the electrode element to approximately halfway through the thickness of the electrode element. Other variations for slots are also useful. For example, FIG. 7 shows a complementary slot arrangement wherein slots 72, are formed along both edges of the electrode elements 71, 75, in an alternating manner. Each slot 72, is formed adjacent to regions of intact electrode material 74. As a further example, FIG. 8 shows a complementary slot arrangement wherein matching slots 82, are formed along each edge of electrode element 81, leaving a region of intact electrode material 84, therebetween. Further, complementary slots 82, are formed as rectangular holes through electrode element 85, with regions of intact electrode material 84, extending from slots 82, to the edges of the electrode element 85.

The present invention may be typified in the following example of the fabrication of a folded bicell such as shown in FIG. 5.

Example I

A folded bicell battery of 30 mm×50 mm was prepared according to the present invention utilizing as the positive electrode members 11, 15, two 180 mm×50 mm sheets of a composition of 79 wt % $LiCoO_2$ in a 6.5% matrix of poly(vinylidene fluoride-hexafluoropropylene) (PVdF-HFP) with 3.5% conductive carbon and 11% propylene carbonate plasticizer having embedded therein by thermal lamination similarly sized layers of expanded aluminum Microgrid (Delker Corp.) current collectors 16, 18, each conveniently including appropriately located extending tabs for later use as cell terminals. Relief slots 12, of about 2.5 mm×25 mm were die-cut through these electrode members at intervals centered upon five predetermined fold axes 19, spaced at 30 mm from a longitudinal end of a sheet to yield the electrode member pair 11, 15, of complementary shape, as generally depicted in FIG. 1. The common negative electrode member 13, was prepared from a sheet of a composition of 72% graphite in a 7.5% matrix of PVdF-HFP copolymer with 2.5% conductive carbon and 18% propylene carbonate plasticizer having an embedded current collector 17, of copper mesh or foil. The resulting electrode members 11, 13, 15, were edge-register aligned in the attitudes shown in FIG. 1, with intervening separator elements 22, of microporous polyolefin membrane (Celgard Corp.) to obtain the assembly of FIG. 2. This assembly was then thermally laminated to form a unified, single plane bicell. This bicell structure was then folded, e.g. in zigzag fashion, along axes 19, to yield the final compact 30 mm×50 mm bicell battery structure shown in FIG. 5. The bicell then had the plasticizer removed, e.g., by extraction with diethyl ether, and was activated by saturation with a 1 M electrolyte solution of $LiPF_6$ in an equipart mixture of ethylene carbonate and dimethyl carbonate. The activated bicell battery was repeatedly charged and discharged at a C/4 rate through about 70 cycles and exhibited a stable capacity of about 600 mAh.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A multi-fold rechargeable battery cell structure comprising:
   a laminated assembly of
      a first elongate planar electrode element,
      a separator element contacting said first electrode element, and
      a second elongate planar electrode element contacting said separator element opposite said first electrode element,
      said assembly being folded along spaced lateral axes to form said cell structure;
   wherein portions of said first electrode element and portions of said second electrode element have been removed from regions corresponding to each fold axis to form a relief slot adjacent to a region of intact electrode material at each fold axis, said relief slots of said first electrode element being aligned with said regions of intact electrode material of said second electrode element and said relief slots of said second electrode element being aligned with said regions of intact electrode material of said first electrode element.

2. A cell structure according to claim 1, further including a first electrically conductive current collector associated with said first electrode element and a second electrically conductive current collector associated with said second electrode element.

3. A cell structure according to claim 1, wherein said regions of intact electrode material are of sufficient size and placement to prevent relative planar displacement of said first electrode element and said second electrode element.

4. A cell structure according to claim 3, wherein each said region of intact electrode material has a length of about one half of its respective fold axis.

5. A cell structure according to claim 1, wherein said assembly is folded in a zigzag fashion.

6. A cell structure according to claim 1, wherein said separator element extends beyond the edges of said first electrode element and said second electrode element.

7. A multi-fold rechargeable battery cell structure comprising:
- a laminated assembly of
  - a first elongate planar electrode element of a first polarity,
  - a first separator element contacting said first electrode element,
  - a second elongate planar electrode element of a second polarity opposite said first polarity and contacting said first separator element opposite said first electrode element,
  - a second separator element contacting said second electrode element opposite said first separator element, and
  - a third elongate planar electrode element of said first polarity and contacting said second separator element opposite said second electrode element, said assembly being folded along spaced lateral axes to form said cell structure;
- wherein portions of said first electrode element and portions of said third electrode element have been removed from regions corresponding to each fold axis to form a relief slot adjacent to a region of intact electrode material at each fold axis, said relief slots of said first electrode element being aligned with said regions of intact electrode material of said third electrode element and said relief slots of said third electrode element being aligned with said regions of intact electrode material of said first electrode element.

8. A cell structure according to claim 7, wherein said first polarity is positive.

9. A cell structure according to claim 7, further including a first electrically conductive current collector associated with said first electrode element, a second electrically conductive current collector associated with said second electrode element and a third electrically conductive current collector associated with said third electrode element.

10. A cell structure according to claim 7, wherein said regions of intact electrode material are of sufficient size and placement to prevent relative planar displacement of said first electrode element and said third electrode element.

11. A cell structure according to claim 10, wherein each said region of intact electrode material has a length of about one half of its respective fold axis.

12. A cell structure according to claim 7, wherein said assembly is folded in a zigzag fashion.

13. A cell structure according to claim 7, wherein said first separator element extends beyond the edges of said first electrode element and said second electrode element, and wherein said second separator element extends beyond the edges of said second electrode element and said third electrode element.

14. A method of making a multi-fold rechargeable battery cell structure comprising the steps of:
- providing a first elongate planar electrode element; removing portions of said first electrode element from regions corresponding to spaced lateral fold axes for said cell structure to form relief slots adjacent to regions of intact electrode material in said first electrode element; providing a second elongate planar electrode element; removing portions of said second electrode element from regions corresponding to fold axes to form relief slots adjacent to regions of intact electrode material in said second electrode element; forming an assembly of
  - said first electrode element,
  - a separator element, and
  - said second electrode element;
- aligning said assembly such that relief slots of said first electrode element align with said regions of intact electrode material of said second electrode element and said relief slots of said second electrode element align with said regions of intact electrode material of said first electrode element; and
- folding said assembly along said fold axes to form said cell structure.

15. A method according to claim 14, wherein said step of forming said assembly comprises laminating said first electrode element and said second electrode element to said separator element.

16. A method according to claim 14, wherein said step of folding comprises folding in a zigzag fashion.

17. A method according to claim 14, further comprising the step of providing a first electrically conductive current collector for said first electrode element and providing a second electrically conductive current collector for said second electrode element.

18. A method of making a multi-fold rechargeable battery cell structure comprising the steps of:
- providing a first elongate planar electrode element of a first polarity;
- removing portions of said first electrode element from regions corresponding to spaced lateral fold axes for said cell structure to form relief slots adjacent to regions of intact electrode material in said first electrode element;
- providing a second elongate planar electrode element of a second polarity opposite said first polarity; providing a third elongate planar electrode element of said first polarity;
- removing portions of said third electrode element from regions corresponding to said fold axes to form relief slots adjacent to regions of intact electrode material in said third electrode element;
- forming an assembly of
  - said first electrode element,
  - a first separator element, said second electrode element,
  - a second separator element, and
  - said third electrode element;
- aligning said assembly such that relief slots of said first electrode element align with said regions of intact electrode material of said third electrode element and said relief slots of said third electrode element align with said regions of intact electrode material of said first electrode element; and
- folding said assembly along said fold axes to form said cell structure.

19. A method according to claim 18, wherein said first polarity is positive.

20. A method according to claim 18, wherein said step of forming said assembly comprises laminating said first electrode element and said second electrode element to said first separator element and laminating said second electrode element and said third electrode element to said second separator element.

21. A method according to claim 18, wherein said step of folding comprises folding in a zigzag fashion.

22. A method according to claim 18, further comprising the step of providing a first electrically conductive current collector for said first electrode element, providing a second electrically conductive current collector for said second electrode element and providing a third electrically conductive current collector for said third electrode element.

* * * * *